United States Patent
Kennedy

(10) Patent No.: US 9,073,244 B2
(45) Date of Patent: Jul. 7, 2015

(54) IN-MOLD LABELING SYSTEM FOR CONTAINERS

(75) Inventor: Patrick R. Kennedy, Gates Mill, OH (US)

(73) Assignee: MPT, INC., Willoughby, OH (US)

(*) Notice: Subject to any disclaimer, the term of this patent is extended or adjusted under 35 U.S.C. 154(b) by 1417 days.

(21) Appl. No.: 12/120,399

(22) Filed: May 14, 2008

(65) Prior Publication Data
US 2008/0286506 A1   Nov. 20, 2008

Related U.S. Application Data

(60) Provisional application No. 60/938,289, filed on May 16, 2007.

(51) Int. Cl.
| | |
|---|---|
| B32B 1/02 | (2006.01) |
| B29C 45/00 | (2006.01) |
| B29C 45/14 | (2006.01) |
| B65D 23/14 | (2006.01) |
| B29L 31/00 | (2006.01) |

(52) U.S. Cl.
CPC ......... B29C 45/14811 (2013.01); *Y10T 428/13* (2015.01); *B65D 23/14* (2013.01); *B29C 2045/14918* (2013.01); *B29K 2715/006* (2013.01); *B29L 2031/7134* (2013.01)

(58) Field of Classification Search
CPC .................. Y10T 428/1352; B29C 45/14811; B29C 2045/14918; B65D 23/14
USPC ......... 428/34.1, 34.2, 35.7, 36.6, 36.7, 36.92, 428/40.1–42.3
See application file for complete search history.

(56) References Cited

U.S. PATENT DOCUMENTS

| | | |
|---|---|---|
| 3,854,229 A | 12/1974 | Morgan |
| 3,974,311 A | 8/1976 | Cherrin |
| 4,014,816 A | 3/1977 | Hogan et al. |
| 4,090,464 A | 5/1978 | Bishopp et al. |
| 4,104,816 A | 8/1978 | Pingeton |

(Continued)

FOREIGN PATENT DOCUMENTS

| | | |
|---|---|---|
| DE | 4 028 276 | 3/1992 |
| FR | 2 649 522 | 1/1991 |

(Continued)

OTHER PUBLICATIONS

International Search Report and Written Opinion from corresponding PCT Application PCT/US08/63585, mailed Oct. 29, 2008.

(Continued)

*Primary Examiner* — Walter B Aughenbaugh
(74) *Attorney, Agent, or Firm* — Pearne & Gordon LLP

(57) ABSTRACT

A container or other article is integrally molded to a labeling assembly. The labeling assembly includes a release surface for releasably supporting an adhesive label for identifying a feature of the container. A method of making a container having an in-mold labeling assembly is also disclosed. A labeling assembly is provided in a mold cavity so that the top face of the labeling assembly faces away from the hollow mold cavity. Moldable material is introduced into the mold cavity to form the container and the formed container is integrally molded to the labeling assembly. A method for tracking the contents of a container using such an assembly is also provided.

30 Claims, 2 Drawing Sheets

(56) References Cited

U.S. PATENT DOCUMENTS

| | | | |
|---|---|---|---|
| 4,253,899 A | 3/1981 | Takemoto et al. | |
| 4,264,657 A | 4/1981 | Tollette | |
| 4,359,358 A | 11/1982 | Hattemer | |
| 4,363,685 A | 12/1982 | White | |
| 4,387,816 A * | 6/1983 | Weckman | 215/381 |
| 4,398,985 A | 8/1983 | Eagon | |
| 4,479,838 A | 10/1984 | Dunsirn et al. | |
| 4,521,267 A | 6/1985 | Jacobson | |
| 4,534,582 A | 8/1985 | Howard | |
| 4,642,256 A | 2/1987 | Sato | |
| 4,767,654 A | 8/1988 | Riggsbee | |
| 4,863,772 A | 9/1989 | Cross | |
| 4,872,707 A | 10/1989 | deBruin | |
| 4,876,131 A | 10/1989 | Ashby et al. | |
| 4,928,874 A | 5/1990 | Henry et al. | |
| 4,932,684 A | 6/1990 | Vermeulen | |
| 4,933,124 A | 6/1990 | Duncan | |
| 4,938,414 A | 7/1990 | Lippert | |
| 5,019,436 A | 5/1991 | Schramer et al. | |
| 5,021,273 A | 6/1991 | Kobayashi | |
| 5,056,827 A | 10/1991 | Sasso | |
| 5,129,976 A | 7/1992 | Horikiri | |
| 5,172,936 A * | 12/1992 | Sullivan et al. | 283/81 |
| 5,248,536 A | 9/1993 | Du Katz | |
| 5,254,302 A * | 10/1993 | Yamanaka | 264/129 |
| 5,383,568 A | 1/1995 | Tusick et al. | |
| 5,417,790 A | 5/1995 | Petrou | |
| 5,543,191 A * | 8/1996 | Dronzek et al. | 428/41.5 |
| 5,628,858 A | 5/1997 | Petrou | |
| 5,682,143 A | 10/1997 | Brady et al. | |
| 5,822,714 A | 10/1998 | Cato | |
| 5,841,365 A | 11/1998 | Rimkus | |
| 5,963,134 A | 10/1999 | Bowers et al. | |
| 6,078,259 A | 6/2000 | Brady et al. | |
| 6,107,920 A | 8/2000 | Eberhardt et al. | |
| 6,137,414 A | 10/2000 | Federman | |
| 6,144,301 A | 11/2000 | Frieden | |
| 6,145,231 A | 11/2000 | Valiulis | |
| 6,147,662 A | 11/2000 | Grabau et al. | |
| 6,195,006 B1 | 2/2001 | Bowers et al. | |
| 6,204,764 B1 | 3/2001 | Maloney | |
| 6,206,282 B1 | 3/2001 | Hayes, Sr. et al. | |
| RE37,164 E | 5/2001 | Petrou | |
| 6,226,912 B1 | 5/2001 | Tackett et al. | |
| 6,229,445 B1 | 5/2001 | Wack | |
| 6,265,977 B1 | 7/2001 | Vega et al. | |
| 6,294,998 B1 | 9/2001 | Adams et al. | |
| 6,422,605 B1 * | 7/2002 | Lind | 283/81 |
| 6,451,154 B1 | 9/2002 | Grabau et al. | |
| 6,520,544 B1 | 2/2003 | Mitchell et al. | |
| 6,669,089 B2 | 12/2003 | Cybulski et al. | |
| 6,773,653 B2 | 8/2004 | Miller et al. | |
| 6,943,678 B2 | 9/2005 | Muirhead | |
| 6,994,262 B1 | 2/2006 | Warther | |
| 7,135,979 B2 | 11/2006 | Savagian et al. | |
| 7,155,304 B1 | 12/2006 | Charych | |
| 7,204,652 B2 | 4/2007 | Warther | |
| 7,211,163 B2 | 5/2007 | Kennedy | |
| 7,225,993 B2 | 6/2007 | Warther | |
| 7,259,678 B2 | 8/2007 | Brown et al. | |
| 7,271,726 B2 | 9/2007 | Hollon | |
| 7,325,510 B2 * | 2/2008 | Giewercer | 116/324 |
| 7,374,102 B2 | 5/2008 | Arnold et al. | |
| 7,388,492 B2 | 6/2008 | Watanabe | |
| 7,417,550 B2 | 8/2008 | Brown et al. | |
| 2003/0145945 A1 | 8/2003 | Kennedy | |
| 2006/0097849 A1 | 5/2006 | Dando | |
| 2006/0208893 A1 | 9/2006 | Anson et al. | |
| 2006/0232412 A1 | 10/2006 | Tabacman et al. | |
| 2006/0255948 A1 | 11/2006 | Runyon et al. | |
| 2006/0255949 A1 | 11/2006 | Roeder et al. | |
| 2006/0255950 A1 | 11/2006 | Roeder et al. | |
| 2006/0290505 A1 | 12/2006 | Conwell et al. | |
| 2006/0290514 A1 | 12/2006 | Sakama et al. | |
| 2007/0040684 A1 | 2/2007 | McAllister | |

FOREIGN PATENT DOCUMENTS

| | | |
|---|---|---|
| GB | 1 090 590 | 11/1967 |
| JP | 2004-66669 | 3/2004 |
| KR | 1997-0003934 | 3/1997 |

OTHER PUBLICATIONS

Prosecution history for U.S. Appl. No. 12/191,088.

"RFID enhances materials handling," Michael Ollivier, Sensor Review, vol. 15, No. 1, 1995, pp. 36-39.

IRS Package 1040-5, mailed by IRS in 2006, but believed similar to that used and mailed to taxpayers by IRS at least as early as 2000.

* cited by examiner

IN-MOLD LABELING SYSTEM FOR CONTAINERS

This application claims the benefit of U.S. provisional application Ser. No. 60/938,289 filed May 16, 2007, the contents of which are incorporated herein in their entirety by reference.

BACKGROUND OF THE INVENTION

1. Field of the Invention

The present invention is directed in general to an in-mold labeling assembly for a container, and more particularly to a container having a labeling assembly for releasably supporting a pressure-sensitive label molded in an exterior face of the container. The present invention is further directed to a method for making a container comprising an in-mold labeling assembly.

2. Description of Related Art

Containers often require a labeling system to identify the contents, or other feature of each container. The label can provide information such as the origin and destination of the contents, batch number, part number, serial number, quantity, and description, for example. In most cases, these containers are reusable and are thoroughly cleaned prior to reuse or being refilled with contents of a different nature.

According to a conventional labeling assembly, a transparent envelope for displaying a label is secured to the container. A label bearing visual indicia identifying the feature of the container or its contents is placed inside the envelope where it can be viewed, thereby indicating the feature to an observer. When the feature of the container changes, such as when its contents are changed, for example, a new label with visual indicia reflecting this change is positioned in the envelope in place of the previous label. However, when the container is cleaned before reuse, the cleaning process and cleaning agents can degrade the transparency of the envelope, causing interference with the visibility of the visual indicia on the label. Interference is also experienced where, after time, the transparent envelope becomes stained or dusty due to the environment the container is in. Also, the transparent envelopes are sometimes bulky and subject to tearing and catching on objects.

Other proposed labeling assemblies call for an adhesive placard to be secured onto a container. Examples of such systems are those disclosed in U.S. Pat. No. 5,628,858 and U.S. Pat. No. RE37, 164, both of which are incorporated by reference in their entirety herein. According to the methods described in these patents, the adhesive placard has an exposed release layer that facilitates the easy removal and replacement of pressure-sensitive adhesive labels. When the status of the container changes such as when its contents are changed, for example, the previous label is cleanly removed without leaving residual adhesive behind and a new label with current information is substituted in its place. Although the reading of the label and other visual labeling indicia is not obstructed by a transparent envelope, the release layer and adhesive coated inner face may be prone to wear and separation from the container resulting from daily activities or rigorous cleaning conditions under certain circumstances.

In the present invention, a labeling assembly, such as a placard, can be molded directly into the container structure or body. Molding in a labeling assembly during the process of making a container reduces the time and cost of separately applying a labeling system after a container has been made. Also, because the labeling assembly is molded into the container and not attached by an adhesive, it is less susceptible to being separated therefrom due to general wear and tear on the container.

BRIEF SUMMARY OF THE INVENTION

A method for making an injection-molded article is provided, which includes the following steps: a) providing a labeling assembly having a top face and a bottom face, wherein the top face includes a release surface for releasably supporting a label thereon; b) positioning the labeling assembly in a mold or die that defines a cavity for molding such article, such that the top face of the labeling assembly is oriented to face outward toward a wall of the mold or die, and the bottom face of the labeling assembly is oriented to face inward toward the cavity; c) introducing moldable material into the cavity to form the article such that the formed article is integrally molded with the labeling assembly.

A method for tracking the contents of a container is also provided, which includes the following steps: a) providing a container having at least one wall with an exterior face, and a labeling assembly integrally molded into that wall and having a release surface for releasably supporting a label thereon, wherein the release surface is oriented facing outwardly from the exterior face of that wall; b) placing a first set of contents into the container; c) applying a first label to the release surface of the labeling assembly, wherein the first label bears information relating to the first set of contents; d) at a select point in time subsequent to applying the first label and placing the first set of contents in the container, removing the first set of contents from the container and placing a second set of contents in the container; and e) removing the first label from the release surface and applying a second label to the release surface of the labeling assembly, wherein the second label bears information relating to the second set of contents.

A container is also provided. The container includes an injection-molded article having a wall with at least one exterior face, and a labeling assembly integrally molded into that wall. The labeling assembly has a release surface for releasably supporting a label thereon. The release surface is oriented to face outwardly from the exterior face of the wall. The labeling assembly has a bottom face, opposite its release surface. The bottom face of the labeling assembly is in contact with the wall of the container.

DETAILED DESCRIPTION OF PREFERRED EMBODIMENTS

Figure 1:
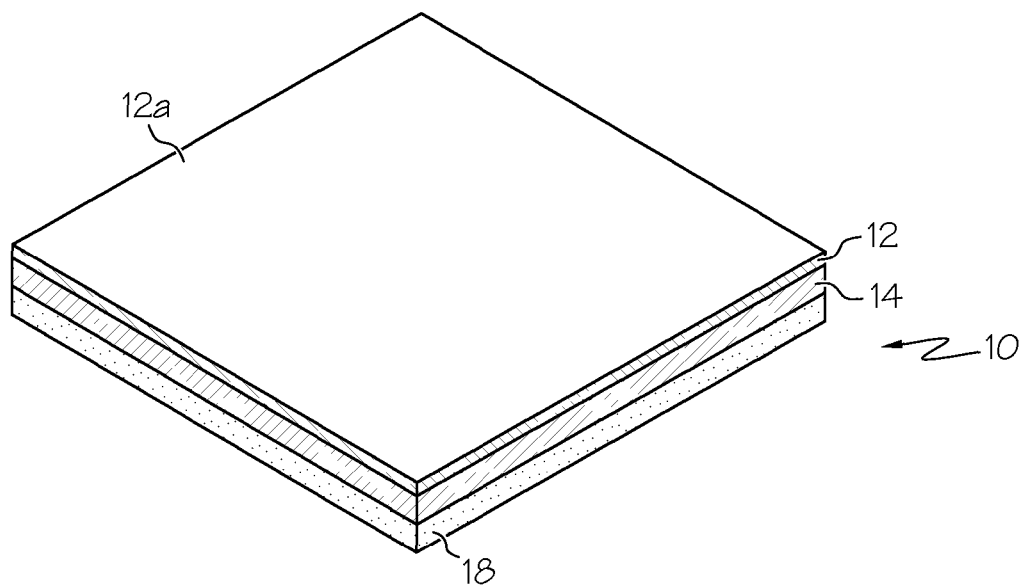
FIG. 1 is an illustrative example of a labeling assembly in accordance with an aspect the present invention.

The present invention relates to a container or similar storage device, common examples of which include bins or totes often used in production lines or factories, having a labeling assembly 10 molded in a portion of the container's structure. The present invention will now be described with reference to the drawings, wherein like reference numerals are used to refer to similar elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details of preferred embodiments are set forth. However, the present invention can be practiced without requiring all of these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

Referring to FIG. 1, there is shown a labeling assembly 10 having a plurality of layers. The labeling assembly 10 provides a release surface 12a thereon which can releaseably support a label, such as a pressure-sensitive label or adhesive label, for identifying a feature of a container that the labeling assembly 10 is molded into. As used herein, a container can include, for example, a storage device, pallet, shelf, bin, tote, storage rack, or any other article having a feature that is changeable over its useful life. Furthermore, the present invention is not limited in its practice to containers, but as will be appreciated it may be practiced in conjunction with any other article to which the labeling assembly 10 can be integrally molded that has or exhibits a feature that changes periodically such that one would desire to affix an appropriate descriptive label to the article. For simplicity, the rest of the description is given with respect to containers even though other articles also may be used. The changeable feature of the container can be any characteristic desired to be identified on or in the container or any other characteristic of the container such as handling instructions. The labeling assembly 10 allows pressure-sensitive labels to be easily applied and removed periodically without a significant build up of residual adhesive from the labels remaining on the release surface 12a of the labeling assembly 10. Pressure-sensitive labels can be removed without ripping or tearing and the releasable surfaces 12a advantageously can reduce the use of plastic envelopes that are conventionally utilized to enclose labels. The features of the labeling assembly 10 allow for use of inexpensive labels with so-called permanent pressure sensitive adhesive coatings rather than more expensive removable adhesive coatings that would have to be used in the absence of a suitable release surface. In use, the labeling assembly 10 can be die-cut into any desired shape.

The labeling assembly 10 will now be more fully described. Referring to FIG. 1, a labeling assembly 10 can comprise a polymer layer 14 having a top face and a bottom face. A release layer 12 is provided on the top face of the polymer layer 14. The polymer layer 14 can optionally have an adhesive backing layer 18 provided on the bottom face of layer 14. If present, the adhesive backing layer 18 provides the bottom face of the labeling assembly 10. Otherwise, the polymer layer 14 or release layer 12 provide the bottom face of the labeling assembly 10. Although not shown, it is to be understood that the layer arrangement shown in FIG. 1 and in the other Figures can include additional layers between or beneath the layers shown.

As described herein, and as shown in FIGS. 1 through 6, an adhesive backing layer 18 is not a preferred embodiment of the present invention. Although the optional adhesive layer 18 can help improve adhesion of the labeling assembly 10 to an object or moldable material, layer 18 may not be required depending on the composition of the release layer 12, polymer layer 14, and/or the object or moldable material used to form the container. For example, selection of modable materials for these layers and/or materials may reduce or eliminate the need of an adhesive layer 18 or render its contribution to adhesion of the labeling assembly 10 minimal.

The release layer 12 of FIG. 1 provides a release surface 12a for releasably supporting a pressure sensitive label. As shown the release surface 12a of the release layer 12 provides the top face of the labeling assembly 10. The release layer 12 may be a coating applied to the top face of the polymer layer 14. The release layer 12 can be applied to the polymer layer 14 by any conventional method such as spraying or rolling on as a liquid. The release layer 12 can be formed from commercially available materials such as silicone or polytetrafluoroethylene (PTFE). The polymer layer 14 and release layer 12 can be a commercially available product in the form of a single sheet or film. For example, a transparent polypropylene film having a silicone release coating on one side of the polypropylene film is available from the Mobil Chemical Corporation. Alternatively, the release layer 12 need not be a coating that is supplied to a separate polymer layer 14. Instead, the release layer 12 itself can be a layer of material (e.g., silicones, polytetrafluoroethylenes or PTFE) having sufficient thickness and structural integrity so that no reinforcing backing layer, such as the illustrated polymer layer 14, is required. Herein the terms "release layer" is intended to refer collectively to such a layer applied as a coating onto a separate polymer layer 14 as seen in FIG. 1 (or onto other material layers), as well as a free-standing layer of release material that is self-supporting and therefore need not be coated onto another layer, such as an adhesive backing layer 18 or polymer layer 14. Of course, a self-supporting or free-standing layer of release material could be provided laminated or adhered to another layer if desired, for example to promote adhesion of the molded container to the labeling assembly 10 as the former is molded, more fully described below.

The polymer layer 14 of FIG. 1 provides a solid, flexible or pliable material on to which the release layer 12 can be applied as a coating in the corresponding embodiment mentioned above. The polymer layer 14 is preferably a durable and wear-resistant layer that can withstand temperature change variations without significantly deforming or changing shape. The polymer layer 14 can be formed from a material that is durable and resistant to industrial solvents, cleaning agents and prolonged exposure to ultraviolet light. The flexible nature of the polymer layer 14 allows the labeling assembly 10 to be molded to the contoured shape of a container. For instance, the flexible polymer layer 14 can conform to the curved wall surface of a container where the labeling assembly 10 is molded.

The polymer layer 14 can be composed of commercially available materials. For example, the polymer layer 14 can be a polymeric material such as polypropylene, polyolefin or polyester. In order to facilitate printing visual indicia on the labeling assembly 10, the material comprising the polymer layer 14 can be transparent and indicia can be reverse printed on the rear face of the layer 14 so that it is visible from the front once the assembly 10 is molded into a container. A suitable, commercially-available polyolefin material that can be used as a polymer layer 14 is provided by the Fasson Company.

As described above, the optional adhesive backing layer 18 of FIG. 1 can be applied to the polymer layer 14 in order to facilitate adhesion of the labeling assembly 10 to the moldable material that forms a container. The adhesive backing layer 18 can be selected so as to adhere to the moldable material that the forms a container to help ensure that the labeling assembly 10 does not release or become unattached from the container structure.

An optional adhesive backing layer 18 is preferably a heat-activated adhesive. The adhesive backing layer 18 can be applied to the polymer layer 14 and/or release layer 12 in any conventional coating method such as spraying or rolling. For example, the heat-activated adhesive material can be dissolved in a solvent and applied to the polymer layer 14 in the liquid form by rolling and subsequently letting the solvent evaporate from the applied adhesive backing layer 18. As the solvent evaporates, the applied adhesive material becomes dry and smooth to the touch such that it does not stick to other materials at room temperature. The adhesive backing layer 18 becomes sticky and adheres to a surface it is in contact with when the layer 18 is heated and exposed to a hot surface or material, such as injection-molded molten plastic material when making a container via injection molding. The coating weight of the adhesive layer 18 can be varied as desired.

Figure 2:
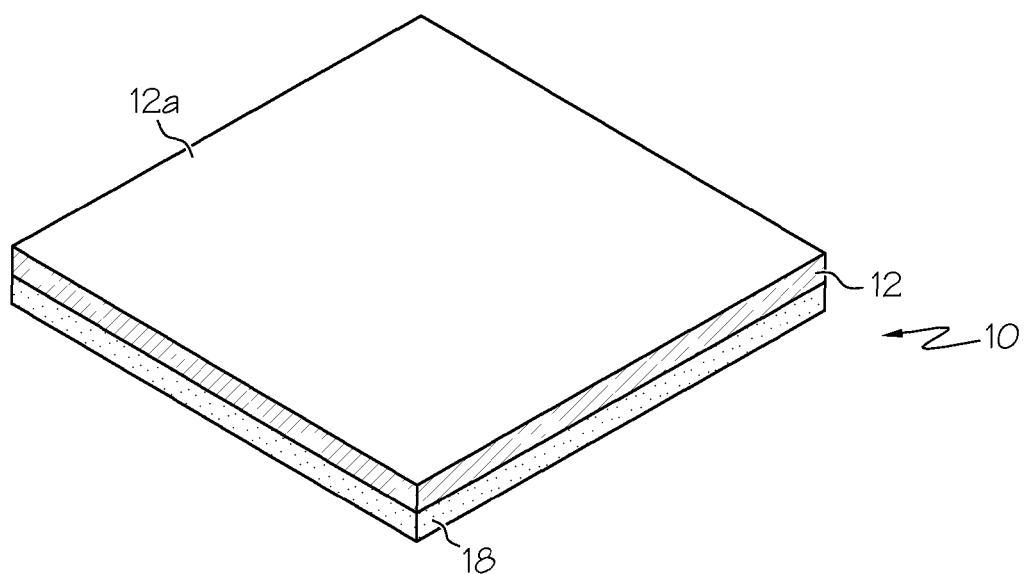
FIG. 2 is an illustrative example of a labeling assembly in accordance with an aspect of the present invention.

In another embodiment, a multi-layer labeling assembly 10 is shown in FIG. 2. As in the previous embodiment, the adhesive backing layer 18 of this embodiment is an optional layer and can be the same as the adhesive backing layer 18 discussed above with regard to FIG. 1. The optional adhesive backing layer 18 is preferably a heat-activated adhesive layer that can facilitate adhesion of the labeling assembly 10 to the moldable material that forms a container or storage device. The adhesive backing layer 18 of FIG. 2 can be applied to the bottom face of the release layer 12, which in this embodiment is a stand-alone layer and is not coated onto a support layer such as layer 14 in FIG. 1. The top face 12a of the release layer 12 faces outward from the container into which the labeling assembly 10 is molded. The release layer 12 and/or the top face 12a thereof provides a release surface on which a pressure-sensitive label can be releasably applied, i.e. surface 12a is a release surface.

The release layer 12 can be composed of a material that inherently possesses release characteristics. Thus, the material that forms the release layer 12 has a releasable surface (e.g. surface 12a) when formed into a film or sheet. Thus, the release surface 12a of the embodiments is provided by a release material. The release surface may be a property from which the film is made, in which case the material that forms the release layer 12 does not require a release coating to be applied over the surface of the layer 12 in order to releasably support a pressure-sensitive layer. A release layer material such as a silicone coating product useful in the embodiments of FIG. 1 is provided by the Hanson company. Alternatively, the release layer 12 can be composed of a polymeric material, such as polypropylene, polyolefin or polyester, that is doped or mixed with a component or additive that will impart release characteristics. For example, the releasable component polytetrafluoroethylene can be combined with a polymeric material such as polypropylene and extruded as a film that forms the release layer 12. The polytetrafluoroethylene component of the release layer 12 provides the release characteristic of the layer 12, and therefore surface 12a.

Figure 3:
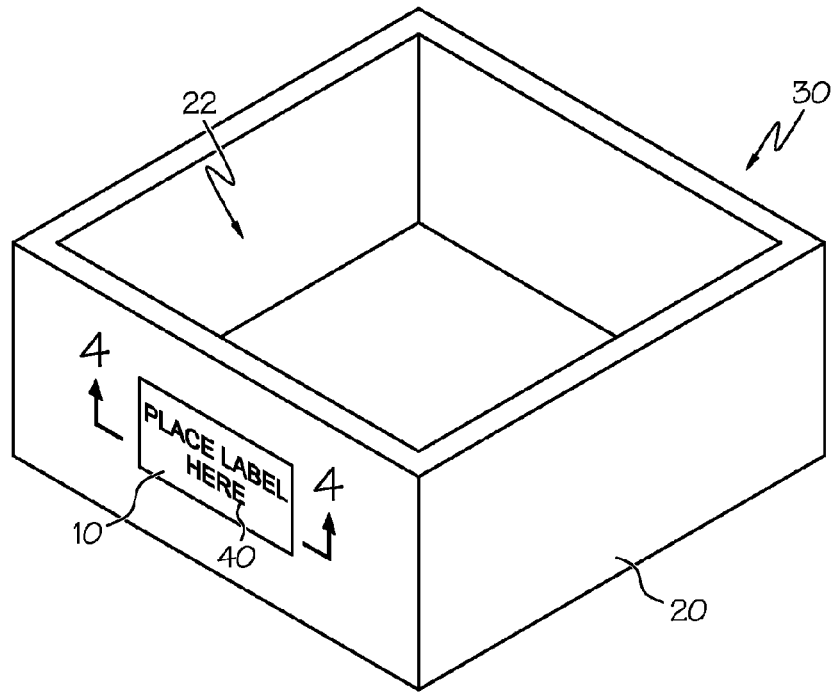
FIG. 3 is an illustrative example of a container having a labeling assembly integrally molded in the wall of the container in accordance with an aspect of the present invention.

As illustrated in FIG. 3, the labeling assembly 10 is integrally molded into the wall 20 of a container 30 such that the release layer 12 faces outward from the interior of the container 30. In other words, the release layer 12 is outermost and the adhesive backing layer 18, if used, is integrally secured to the wall 20 of the container 30.

Visual indicia 40, as shown in FIG. 3, can optionally appear on the labeling assembly 10 to convey instructional or identifying information, for example. FIG. 3 illustrates the visual indicia 40 reading, "place label here," to indicate where a label can be releasably applied. Other visual indicia can be included or can replace that shown to provide a source of information relating to the container into which the labeling assembly 10 is molded. Since the visual indicia 40 are printed on the labeling assembly 10, such indicia convey information that does not change. The visual indicia 10 can be printed on the polymer layer 14.

Figure 4:
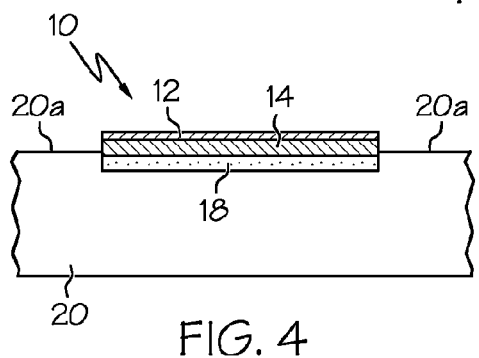
FIG. 4 illustrates a cross-sectional view of the wall of the container of FIG. 3 having a labeling assembly integrally molded therein in accordance with an aspect of the present invention.
Figure 5:
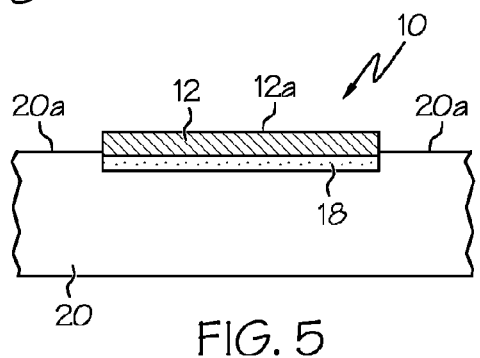
FIG. 5 is a cross-sectional view, as in FIG. 4, but in accordance with a further aspect of the present invention.
Figure 6:
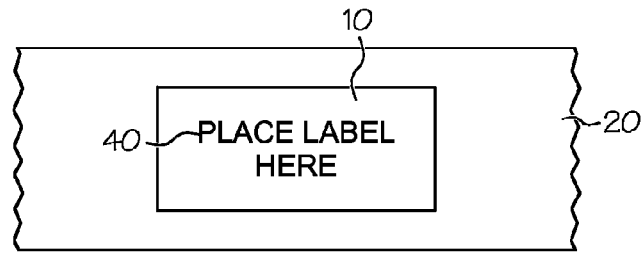
FIG. 6 is a front view of a container wall having a labeling assembly integrally molded therein in accordance with an aspect of the present invention.

In use, the labeling assembly 10 according to the described embodiments is substantially permanently molded or integrated into the structure of the container. The releasable surface 12a of the labeling assembly 10 faces outward from the wall 20 of the container 30. As shown in FIGS. 4 and 5, the wall 20 of the container is molded around the labeling assembly so the former is integrally formed around and frames the latter, thereby providing a strong bond between them. The labeling assembly 10 is at least partially recessed within the outer wall 20, beneath the exterior surface 20a of that wall. Preferably, the release surface 12a remains above and non-flush with the plane of the exterior surface 20a of the container wall 20. Less preferably, the labeling assembly 10 can be fully recessed in the wall 20 so that the exterior surface 20a of the wall 20 of the container 30 is flush with the release surface 12a. The release surface 12a and/or the polymer layer 14 can extend beyond the exterior surface 20a of the wall 20. As shown in FIGS. 4 and 5, the optional adhesive backing layer 18 is in contact with the wall 20 of the container and adheres or attaches the polymer layer 14 or release layer 12 to the wall 20. In this regard, the labeling assembly 10 is substantially permanently molded into or integrated into the structure, and in this case, the wall of the container, with the additional reinforcement of being adhered by the adhesive layer 18. In another embodiment (not shown), the polymer layer 14 or release layer 12 can be in contact with the wall 20 or structure of the container, with no intermediate adhesive layer 18 provided.

The labeling assembly 10 can be molded into the structure of a container 30 made via conventional techniques known in the art, such as injection molding. For example, the labeling assembly 10 can be placed in an injection mold cavity or similar mold part such that the release surface 12a of the labeling assembly 10 faces the die wall and thus away from the mold cavity. The wall of the injection mold or die can be machined to have a recess or cut-out in the shape of the labeling assembly 10 to accommodate and retain it prior to completion of an injection molded part that will consequently be molded integrally to the labeling assembly 10. The depth of the recess in the die wall can be designed or adjusted to allow the labeling assembly 10 to extend or protrude outward from the exterior surface 20a of the container 30 or have the releasable surface 12a flush with the exterior surface 20a of the container 30 that is to be molded. It is desirable that the recess depth be selected so that at least the adhesive backing layer 18 (if present) and/or the polymer layer 14 extend into the volume of the mold cavity so as to come into contact with the moldable material used to form the container 30. The moldable material can flow around the labeling assembly 10 to integrally mold the assembly in the container. This will result in the labeling assembly 10 being at least partially recessed in the container wall as shown in FIGS. 4-5.

The containers or similar storage devices of the present invention can be formed from any suitable moldable material such as plastic, thermoset plastic, polymers, rubber, glass, metals, alloys, polypropylene, acrylonitrile butadiene styrene (ABS), nylon, polyethylene, polyvinyl chloride (PVC) or combinations thereof. The moldable material can be in pellet or granule form, and is preferably melted by heat and shearing forces before being introduced into a die or mold cavity. In an injection molding process, a molding material such as polypropylene can be melted and poured or injected at a high pressure in the liquid form into a die cavity in order to form a container. Thermal energy, pressure or a combination thereof is generally applied to the injection mold in order to form the container and/or cure the moldable material. The moldable material solidifies in the shape of the die or mold cavity thus creating the part. The material may be cooled or allowed to cool to ambient temperature before the container is extracted or ejected from the die or mold cavity. If necessary, the moldable material can be cured by elevating the temperature for a desirable period of time. The demolded part will have the labeling assembly 10 molded integrally into its wall 20.

The above described container having the labeling assembly 10 molded into a wall thereof can be used to adequately track and identify contents placed in such a container. Containers used in conjunction with assembly lines, production lines and in factory settings generally are loaded with a first set of contents and at some later point of time after the first set of contents are used or removed, a second set of contents that are different from the first set are placed in the same container. The container having a labeling assembly 10 for releasably supporting a pressure-sensitive label can be used to track and identify what set of contents are being stored or carried in the container. For instance, once the first set of contents are placed in the container, a first label that identifies information relating to the first set of contents can be applied to the release surface 12a of the labeling assembly 10. Alternatively, the first label can be applied to the release surface 12a of the labeling assembly 10 prior to the first set of contents being placed in the container. In this case, it would be known what contents were going to be placed in the container prior to applying the first label to the labeling assembly. At a select point in time after the first set of contents have been removed from the container, the container can be filled with a second set of contents. The first label is removed from the labeling assembly 10 and a second label is applied to the release surface 12a of the labeling assembly 10. The second label identifies information relating to the second set of contents that are in the container. Alternatively, the first label can be removed from the labeling assembly 10 and the second label can be applied to the labeling assembly 10 before the second set of contents are placed in the container. The release surface 12a of the labeling assembly 10 allows a user such as an assembly line worker to easily remove and apply labels for identifying the contents or information relating to the contents of a container as those contents change and/or are replaced with a different set of contents.

It is evident that one skilled in the art given this disclosure could develop equivalent embodiments which are also within the contemplation of the inventors. While embodiments and applications of this invention have been shown and described, it would be apparent to those skilled in the art that many more modifications are possible without departing from the inventive concepts herein. The invention, therefore, is not to be restricted to the preferred embodiments, and is intended to cover modifications and alternatives thereto that fall within the spirit and the scope of the appended claims.

What is claimed is:

1. A container comprising:
    an injection-molded article having a wall with at least one exterior face;
    a labeling assembly integrally molded and at least partially recessed into said wall and having a release surface for releasably supporting an adhesive label thereon, said release surface being exposed, and
    said labeling assembly having a bottom face opposite said release surface, said bottom face being recessed into said wall and in contact with said wall,
    wherein the release surface is provided by a coating of release material on a subjacent layer.

2. The container of claim 1, wherein the container is reusable.

3. The container of claim 1, wherein the release surface and the bottom face are composed of different materials.

4. The container of claim 1, wherein the bottom face of the label assembly and the wall of the container are composed of different materials.

5. The container of claim 1, wherein the bottom face of the labeling assembly is a polymer layer.

6. The container of claim 5, further comprising visual indicia printed on the polymer layer of the labeling assembly, wherein the visual indicia are visible through the release surface.

7. The container of claim 1, said subjacent layer being a polymer layer.

8. The container of claim 7, wherein the labeling assembly further comprises an adhesive backing layer.

9. The container of claim 8, wherein the adhesive backing layer provides the bottom face of the labeling assembly.

10. The container of claim 7, wherein the release material is a polymer.

11. The container of claim 7, wherein the release material comprises at least one of silicone and polytetrafluoroethylene (PTFE).

12. The container of claim 1, wherein the bottom face of the labeling assembly is a polymer selected from the group consisting of polyolefin, polyester, polytetrafluoroethylene (PTFE) and silicone.

13. The container of claim 1, wherein the wall of the container is made from at least one of: polypropylene, acrylonitrile butadiene styrene, nylon, polyethylene and polyvinyl chloride.

14. A container comprising:
    an injection-molded article having a wall with at least one exterior face;
    a labeling assembly integrally molded into said wall and having an exposed release surface for releasably supporting an adhesive label thereon, and
    said labeling assembly having a bottom face, opposite said release surface, said bottom face being in contact with said wall,
    said container further comprising visual indicia printed on the labeling assembly, wherein the visual indicia are visible through a layer of the labeling assembly providing said release surface,
    wherein the release surface is provided by a coating of release material on a subjacent layer.

15. A container comprising:
    an injection-molded article having a wall with at least one exterior face;
    a labeling assembly integrally molded into said wall and having an exposed release surface for releasably supporting an adhesive label thereon, and said labeling assembly having a bottom face, opposite said release surface, said bottom face being in contact with said wall, said container further comprising visual indicia printed on the labeling assembly, wherein the visual indicia are visible through a layer of the labeling assembly providing said release surface, wherein the release surface is provided by a self-supporting release layer composed of a release material.

16. A container comprising:
an injection-molded article having a wall with at least one exterior face;
a labeling assembly integrally molded into said wall and having an exposed release surface for releasably supporting an adhesive label thereon, and
said labeling assembly having a bottom face, opposite said release surface, said bottom face being in contact with said wall, wherein the labeling assembly comprises a release layer and a polymer layer, and the release layer is composed of a polymeric material that is doped or mixed with a component or additive that will impart release characteristics.

17. The container of claim 16, wherein the polymeric material of the release layer is doped with polytetrafluoroethylene.

18. A container comprising:
an article having a wall with at least one exterior face;
a labeling assembly having a bottom face and a release surface, with the labeling assembly being molded into and at least partially recessed into the wall of the article such that said bottom face is positioned below the exterior face of the wall, wherein said release surface is for releasably supporting an adhesive label thereon and is exposed, with said bottom face being positioned opposite said release surface on the labeling assembly, wherein said labeling assembly accepts a removable label thereon,
wherein the release surface is provided by a coating of release material on a subjacent layer.

19. The container of claim 18, wherein the release surface of the labeling assembly faces away from said container and the bottom face of the labeling assembly is positioned below the exterior face of the wall.

20. A method for making the container of claim 1, comprising the steps of:
a) providing a labeling assembly having a top face and a bottom face, wherein the top face comprises a release surface for releasably supporting a label thereon, said release surface being provided by a release layer;
b) positioning said labeling assembly in a mold or die that defines a cavity for molding said article, such that the top face of the labeling assembly is oriented to face outward, toward a wall of said mold or die, and the bottom face of the labeling assembly is oriented to face inward, toward the cavity;
c) introducing moldable material into the cavity to form the article such that the formed article is integrally molded with said labeling assembly.

21. The method of claim 20, wherein the moldable material is selected from the group consisting of polymers, metals or combinations thereof.

22. The method of claim 20, wherein the container is formed by applying pressure and thermal energy to the mold cavity.

23. The method of claim 20, further comprising the step of curing the moldable material.

24. The method of claim 20, wherein said mold or die comprises at least one wall having a recess therein configured to accommodate and retain at least a portion of said labeling assembly therein prior to the introduction of said moldable material into said cavity, and during formation of said formed article.

25. The method of claim 20, wherein the labeling assembly comprising visual indicia that are visible through said top face thereof.

26. The method of claim 24, wherein the depth of said recess in said mold or die wall is selected, in conjunction with a thickness of said labeling assembly, so that said labeling assembly protrudes from said recess and into said cavity a selected extent, so that when moldable material is injected into said cavity, the moldable material is caused to flow around the protruding portion of said labeling assembly, and thereby to mold integrally thereto.

27. The method of claim 26, wherein the release layer is composed of a release material selected from the group consisting of silicones and polytetrafluoroethylenes.

28. The method of claim 20, wherein the release layer is coated on a face of a polymer layer that has an adhesive backing layer on its opposite face.

29. The method of claim 20, wherein the release surface is provided by a self-supporting release layer composed of release material.

30. The method according to claim 20, said article being a container.

* * * * *